United States Patent [19]

Ashby, Jr.

[11] Patent Number: 4,780,041

[45] Date of Patent: Oct. 25, 1988

[54] EXTENDABLE CONVEYOR SYSTEM

[76] Inventor: Charles W. Ashby, Jr., 321 N. Center, Naperville, Ill. 60540

[21] Appl. No.: 81,292

[22] Filed: Aug. 3, 1987

[51] Int. Cl.⁴ .............................................. B65G 67/00
[52] U.S. Cl. ..................................... 414/398; 198/588
[58] Field of Search ............... 198/303, 304, 536, 586, 198/588, 594, 861.2; 414/390-392, 397, 398

[56] References Cited

U.S. PATENT DOCUMENTS

| | | | |
|---|---|---|---|
| 3,827,585 | 8/1974 | McWilliams | 414/398 |
| 3,836,021 | 9/1974 | McWilliams | 414/398 |
| 4,031,997 | 6/1977 | Nelson | 198/303 |
| 4,339,031 | 7/1982 | Densmore | 198/861.2 |
| 4,701,091 | 10/1987 | Yamauchi et al. | 414/398 |

OTHER PUBLICATIONS

"Thrifty-Lifty Conveyors", Publication Date Unknown, sold by Action Material Handling, Inc.
"Rapistan Extendible Belt Conveyors", published 1968, Rapistan Incorporated, Grand Rapids, MI. p. 2.
"Rapistan Overhead Chain and Trolley Conveyors", published 1980, Rapistan Division, p. 5.

Primary Examiner—Joseph E. Valenza
Attorney, Agent, or Firm—Hill, Van Santen, Steadman & Simpson

[57] ABSTRACT

A conveyor system includes a longitudinally movable main conveyor suspended from a rollable trolley riding on a longitudinal rail and is supported on a steerable wheeled frame having a barrier plate mounted thereto. The main conveyor is fed by at least one feed conveyor which is stationarily mounted and preferably is inclined to extend from below the main conveyor.

16 Claims, 3 Drawing Sheets

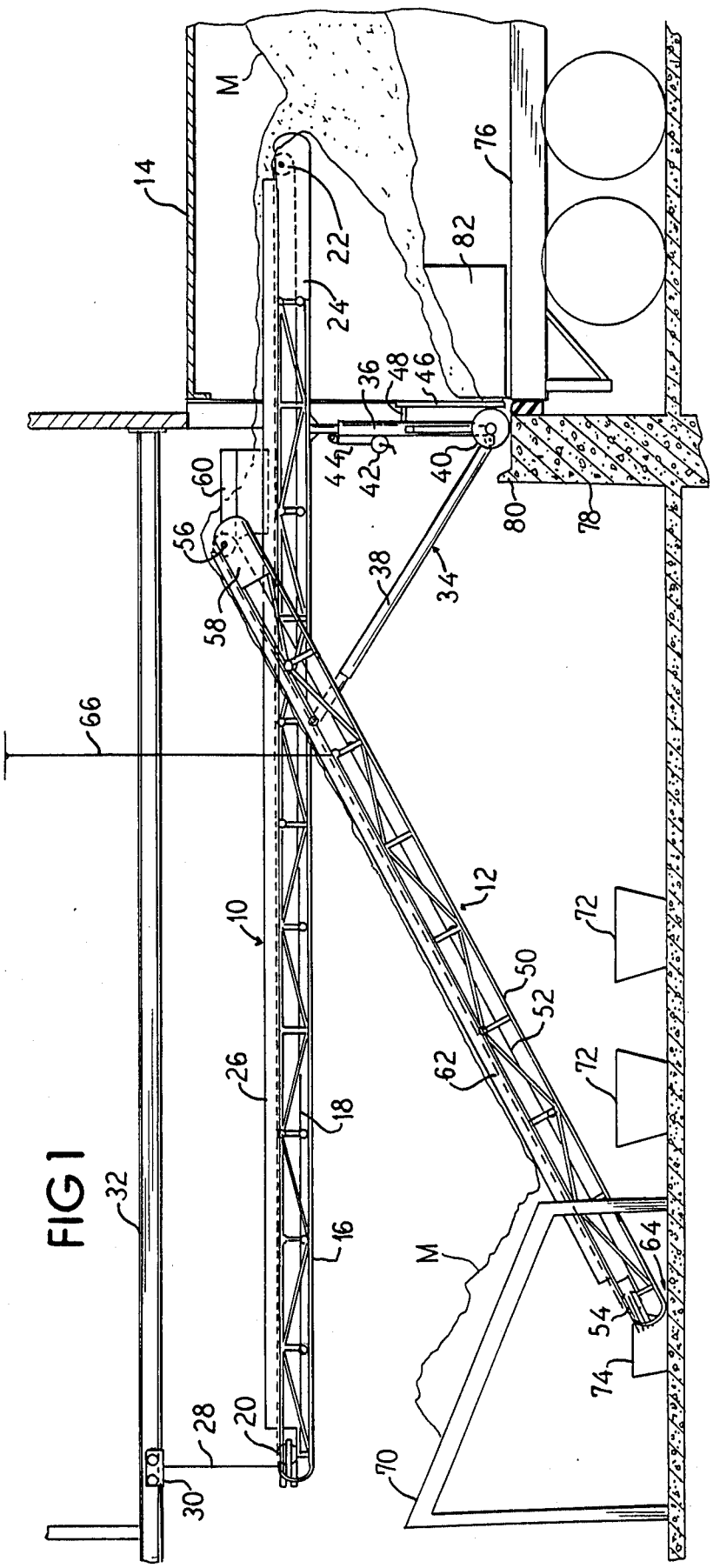
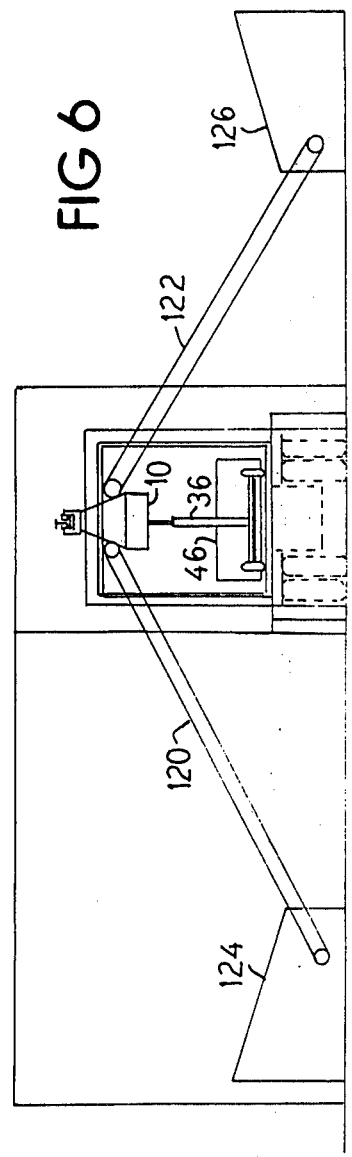
FIG 1
FIG 6

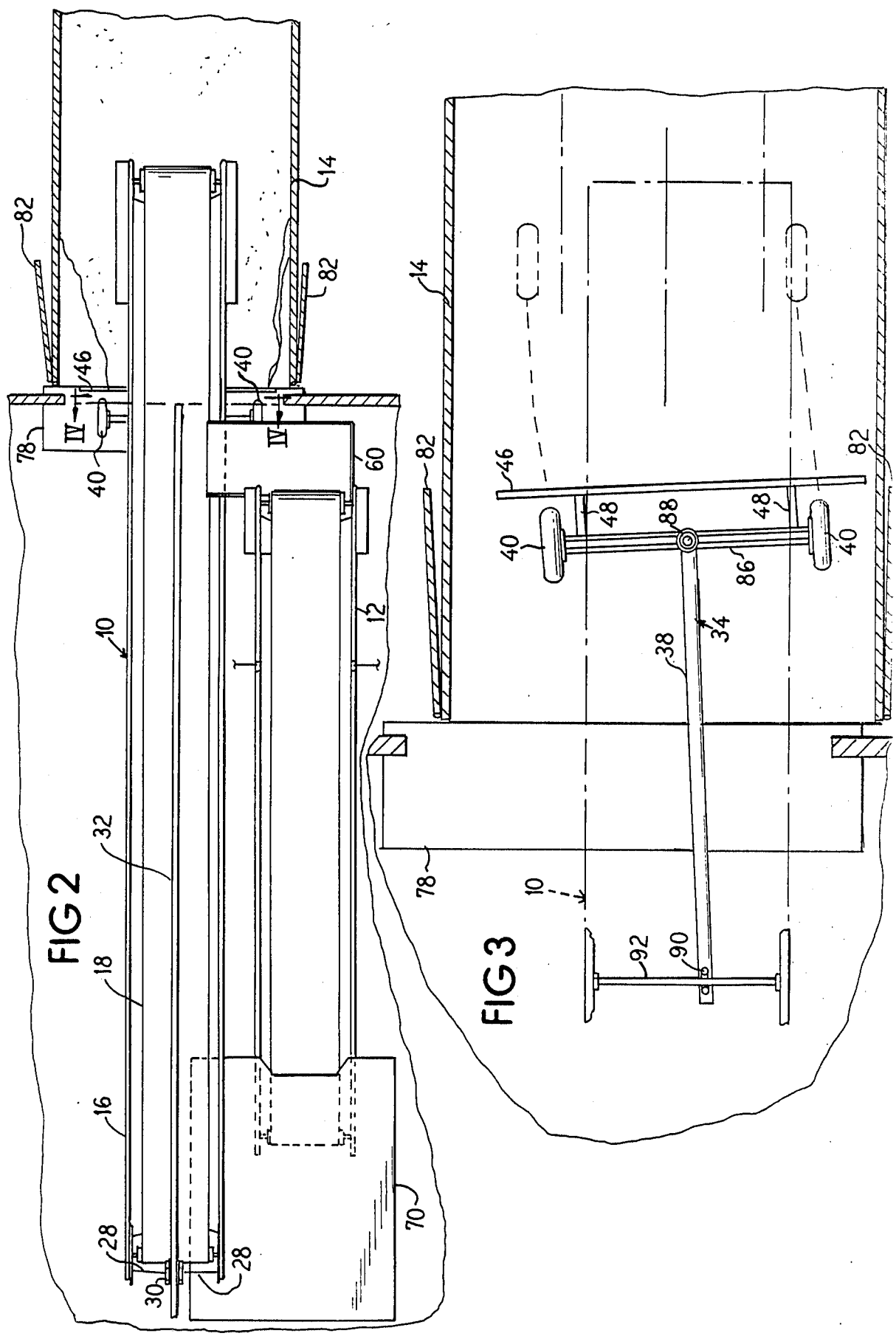

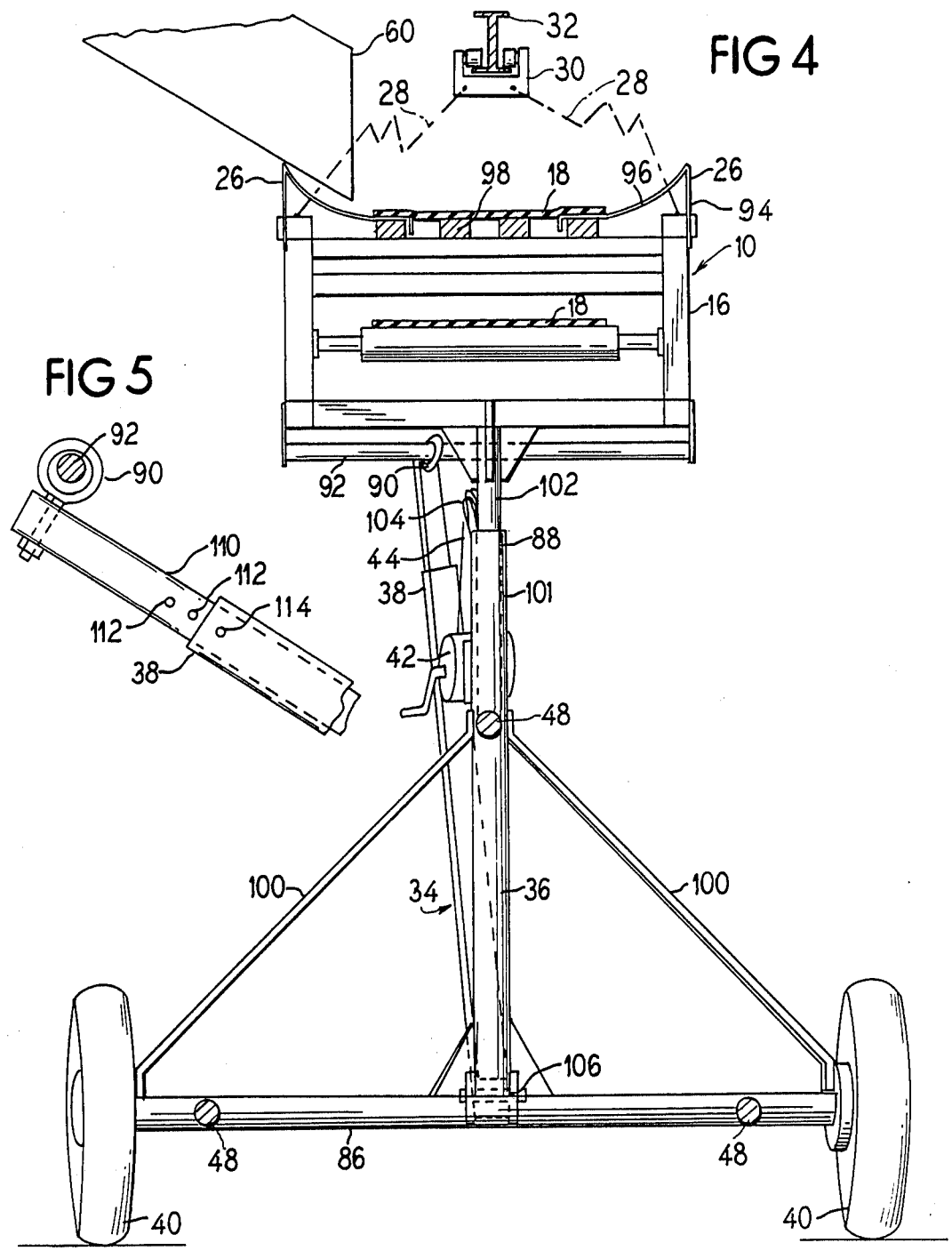

EXTENDABLE CONVEYOR SYSTEM

BACKGROUND OF THE INVENTION

1. Field of the Invention

The present invention relates generally to a conveyor system having a movable main conveyor.

2. Description of the Related Art

Conveyor systems for loading articles into a truck or the like can be either fixed or movable. In a fixed conveyor system, the articles are delivered by the conveyor to a fixed point, such as at an open end of a truck, and then the articles must be put into the desired location within the truck. This necessitates additional handling of the articles.

Movable conveyor systems are available for moving articles into an area, such as into the trailer portion of a truck. One advantage of movable conveyor systems is that the articles are transported directly to a location for unloading without additional handling. It is even possible to move the conveyor to accomodate filling of the truck. One type of movable conveyor is an extendable cantilevered conveyor which can extend into a trailer. The cantilevered conveyor extends horizontally, is mounted on a dock, occupying a great deal of space, and is large, heavy, and expensive due to its cantilevered design. Furthermore, extendable conveyors mounted on a dock cannot compensate for poor truck alignment at the dock door.

A second type of movable conveyor has a first end resting on a floor surface and a second end supported on a wheeled frame. This type of conveyor requires extensive docks or an extended area of floor space over which movement of the conveyor can occur. In addition to requiring a considerable amount of floor space or dock space, the second type of movable conveyors also generally requires that work stations feeding the conveyor be movable as well.

Neither type of movable conveyor system is well suited for handling bulk loading of loose articles such as loose newspapers for recycling.

SUMMARY OF THE INVENTION

An object of the present invention is to reduce handling of articles being loaded into a truck trailer or the like.

Another object of the present invention is to provide a fixed work station in an article loading system.

A further object of the invention is to reduce the floor space and/or dock requirements of a movable conveyor system.

A further object of the invention is to compensate for variations in truck trailer alignment during loading of articles into the truck trailer.

These and other objectives of the present invention are achieved in an extendable conveyor system having a main conveyor with a first end suspended from a movable trolley or the like and a second opposite end supported on a wheeled frame. The movable trolley is movable along a rail or track that extends generally along the length of the conveyor so that the second end of the conveyor with the wheeled frame can be rolled into a truck trailer for loading of articles into the trailer. As the truck trailer fills, the wheeled frame is rolled toward the rear of the truck while the movable trolley supporting the opposite end of the conveyor moves along the rail or track. It is thus possible to fill the entire length of the truck without additional handling of the articles by moving the main conveyor. Since one end of the conveyor is suspended, and only the other end is supported on a wheeled frame which rests in the truck trailer or, for example, on an abbreviated dock, the floor is available for other purposes and no extensive dock is required. The ease of moving the conveyor along the length of a truck trailer facilitates filling of the truck completely, particularly with bulk material. Thus, no boxing or bailing of material is required for efficient filling of the truck.

Articles to be moved by the main conveyor are fed onto the main conveyor by auxiliary side conveyors which are fixed in position. By having fixed auxiliary conveyors, work stations feeding the auxiliary conveyors can remain fixed. The auxiliary conveyors can feed the main conveyor from either side or from below and a plurality of conveyors can even be used to feed a single main conveyor. In a preferred embodiment, an inclined auxiliary conveyor is mounted in a plane generally parallel to that of the main conveyor so that a work station for feeding the auxiliary conveyor is disposed beneath the suspended end of the main conveyor. This arrangement provides an extremely efficient use of floor space.

The present conveyor system is particularly advantageous for use in loading bulk articles when curved side plates are provided extending along each side of the main conveyor. Likewise, a barrier plate mounted on a lower portion of the wheeled frame prevents excessive backsliding of bulk articles during loading. A further advantage is realized when the wheeled frame is steerable to enable the main conveyor to compensate for variations in truck alignment at a loading dock.

The present invention is particularly useful in loading material, such as newspapers for recycling, since no boxing or bailing of the newspapers is required during loading, yet controlled filling of the truck trailer can be accomplished from a fixed sorting and work station.

The present extendable conveyor system is light in weight, simple in construction and can be used in a variety of applications efficiently and effectively without requiring expensive loading docks or large areas of floor space.

BRIEF DESCRIPTION OF THE DRAWINGS

FIG. 1 is a side view of a conveyor system according to the principles of the present invention;

FIG. 2 is a top plan view of the conveyor system shown in FIG. 1;

FIG. 3 is a plan view, partially in phantom, illustrating the steerability of the main conveyor of the invention;

FIG. 4 is a cross section in elevation along line IV—IV of FIG. 2 showing the main conveyor on its wheeled frame;

FIG. 5 is an enlarged fragmentary view showing part of a steering mechanism for the present conveyor system; and FIG. 6 is a schematic end view of an alternate embodiment of the present conveyor system.

DESCRIPTION OF THE PREFERRED EMBODIMENTS

Referring first to FIG. 1, the present conveyor system is shown including a main conveyor 10 and an auxiliary or feed conveyor 12 for loading bulk material M into a tractor trailer 14 or the like. The main conveyor 10 is an elongated structure formed by a frame 16 with an endless belt 18 extending between a pair of end rollers 20 and 22. The end roller 22 is driven by a motor (not shown) mounted within a motor housing 24 at a first end of the conveyor 10. Side plates 26 extend upwardly from each lateral side of the conveyor 10, as will be discussed more fully in conjunction with FIG. 4.

A second end of the conveyor 10 adjacent the roller 20 is suspended by a cable or chain 28 connected to a wheeled trolley 30. The wheeled trolley 30 is mounted for rolling movement along an I-beam 32 which extends generally longitudinally with respect to the conveyor 10. The trolley 30 can be mounted on a rail or track as well.

The first end of the conveyor 10 is supported by a wheeled frame 34 formed by a telescoped upright 36 and a steering bar 38 mounted on a pair of wheels 40. The telescoped upright 36 is variable in height by a winch 42 connected to a cable 44 that engages an inner one of the telescoped upright members. Mounted on the wheeled frame 34 is a barrier member 46 held by brackets 48. The barrier member 46 extends laterally less than the nnterior width of the tractor trailer 14 yet wide enough to prevent articles being loaded thereinto from sliding rearwardly. In the illustrated embodiment, the first end of the conveyor 10 extends beyond the wheeled frame 34 to allow for some shifting of the material being loaded. The amount of extension depends to some extent on the angle of response of the material.

The material M is fed to the main conveyor 10 by the auxiliary or feed conveyor 12, which in the illustrated embodiment lies in a vertical plane generally parallel to that of the main conveyor 10, yet at an inclined angle. Like the main conveyor, the feed conveyor 12 includes a frame 50 having an endless belt 52 mounted on the pair of rollers 54 and 56 and driven by a motor within a motor housing 58. The material M is moved upward by the inclined feed conveyor 12 to a position slightly above the main conveyor 10 and then is deposited onto the main conveyor 10 with the aid of a ramp 60 attached to an upper end of the feed conveyor 12. The ramp 60 has an inclined smooth surface formed, for example, of a steel plate bolted to the end of the feed conveyor 12. Like the main conveyor 10, the feed conveyor 12 and the ramp 60 may have raised sides 62 as well.

The feed conveyor 12 need not be movably mounted, and in the illustrated embodiment, is fixed to a floor mount 64 at one end, while another end is suspended by a cable or chain 66 attached to a ceiling or other support (not shown). By suspending the feed conveyor 12, useful floor space is not occupied by a support frame for the feed conveyor 12.

FIGS. 1 and 2 show the present conveyor system as used in loading bulk material, such as waste newspaper to be recycled, into the tractor trailer 14. The loading setup, as shown, includes a work station 70 in the form of a sloped table upon which the material M is placed for sorting. The material M may include non-recycleable paper products and other materials and so must be sorted prior to loading. Any unwanted matter is removed from the sorting table or work station 70 and placed into trash receptacles 72 which can lie beneath the main conveyor 10. The desired material, here newspapers for recycling, is moved loose onto the inclined feed conveyor 12 from the work station 70. The feed conveyor 12 which can include cleats on the endless belt 52, moves the material M upwardly to the ramp 60 which deposits the material onto the main conveyor 10. A catch receptacle 74 may be provided at a lower end of the feed conveyor 12 under the sorting table 70 to catch any material which slides down the inclined conveyor 12.

The main conveyor 10 is moved into position by rolling the wheeled frame 34 along a floor 76 of the tractor trailer 14 until the first end of the conveyor 10 adjacent the roller 22 is near the front end of the tractor trailer 14. During rolling movement of the wheeled frame 34, the wheeled trolley 30 rolls along the I-beam 32 so that the conveyor 10 remains supported by the wheeled frame 34 and suspended from the trolley 30 even when extended into the tractor trailer 14. The material M which has been deposited onto the main conveyor 10 by the feed conveyor 12 is carried by the conveyor 10 and deposited into the tractor trailer 14. As the tractor trailer 14 begins to fill, the main conveyor 10 is rolled toward the open rear end of the tractor trailer 14 so that the tractor trailer is filled completely. Just as when the wheeled frame 34 is rolled forward, the trolley 30 likewise follows the motion of the conveyor 10 when being moved back. Since bulk material, and in particular loose newspapers for recycling, has a tendency to slide during loading to assume an angle of repose, the first end of the conveyor 10 extends beyond the wheeled frame 34 by several feet. To prevent the sliding material M from falling out of the tractor trailer 14 and/or from interfering with the operation of the wheels 40, the barrier plate 46 is provided on the wheeled frame 34 extending generally across the width of the tractor trailer 14 and preferably to just above the floor of the tractor trailer 14.

During filling of the tractor trailer, the main conveyor 10 is moved backwardly until the wheels 40 are rolled from the floor 76 of the tractor trailer 14 and onto an abbreviated dock 78, preferably including wheel stops 80. The barrier plate 46 prevents the material M from falling out of the tractor trailer 14 as the last of the material M is loaded, so that the tractor trailer 14 can now be pulled away from the abbreviated dock 78 and doors 82 on the tractor trailer 14 closed. Another tractor trailer can be backed up to the abbreviated dock 78 for loading in a similar matter.

In FIG. 2, the main conveyor 10 has the I-beam 32 extending along its length and centered above it. The I-beam 32 preferably extends up to the door of the loading dock for maximum extension capability of the main conveyor 10. The wheeled trolley 30 can either include a pair of opposed support cables or claims 28, as shown, or can include a single support (not shown) connected generally to a center of the conveyor frame 16. The wheels 40 can be seen extending outwardly on either side of the conveyor 10 for improved stability.

As shown, the feed conveyor 12 lies generally parallel to the main conveyor 10 and includes the ramp 60 shaped to feed material from the feed conveyor 12 to the main conveyor 10. The work station 70 is shown disposed partially beneath the main conveyor 10, thereby utilizing floor space advantageously.

As shown in FIG. 3, a tractor trailer 14 occasionally is parked at a loading dock off-center from the dock opening. To ensure even loading of the material M into the tractor trailer, the wheeled frame 34 of the present invention is steerable. The wheels 40 are mounted on an axle 86 from which extends the steering bar 38. A pivot connection is provided at 88 between the axle 36 and the main conveyor 10 so that the steering bar 38 can be moved arcuately to steer the wheels 40. The steering bar 38 is connected to the main conveyor 10 by an eye 90 encircling a transverse cross bar 92 on the frame 16 of the conveyor 10. The eye 90 moves along the cross bar 92 so that the wheels 40 can be steered, as shown in phantom, to align the conveyor 10 within the tractor trailer 14. This not only assures even loading of the material within the tractor trailer 14, but also assures that the barrier wall 46 is aligned within the tractor trailer 14. The flexible support 28 accomodates the steerability of the wheeled frame 34.

With reference now to FIG. 4, the main conveyor 10 is shown in end view being fed by the ramp 60 which discharges material onto the endless belt 18. To ensure that the material M remains on the main conveyor 10, and more specifically on the endless belt 18, the raised side members 26 are provided at each side of the belt 18. In the preferred embodiment, each of the side members 26 includes an upright portion 94 extending upwardly from the frame 16 of the conveyor 10 and a sloped portion 96 extending inwardly from the upright portion 94 to beneath an edge of the endless belt 18. The side members 26 are preferrably each of a single piece of sheet metal for strength, reduced weight, and reduced cost. Also easier to install. When a conveyor structure is used having a plurality of elongated rail portions 98 on which the endless belt 18 slides, the sloped portions 96 of the sides members 26 extend over and are fastened to outer ones of the rails 98. Similar rails and side members can be provided on the feed conveyor 12, as well.

The wheeled frame 34 on which the conveyor 10 is supported has the telescoped upright 36 mounted to the transversely extending axle 86 upon which the wheels 40 are rotatably mounted. For additonal support, support struts 100 extend between each end of the axle 86 and the telescoped upright 36. The telescoped upright 36 has an outer sleeve portion 101 and an inner sleeve 102 which forms the pivot 88 for turning the wheeled frame 34.

The conveyor 10 may be raised or lowered to accommodate varying heights of tractor trailers by operating the winch 42 which carries the cable 44 that in turn extends over a pully 104 and is engaged to the inner sleeve 102. Although small amounts of vertical movement by the telescoped member 36 can be accomodated by play in the wheeled frame 34, larger vertical movements are compensated for by a pivot 106 connecting the steering bar 34 to the transverse axle 86, as well as by a telescoping portion of the steering bar 38. The brackets 48 on which the barrier plate 46 are mounted can be seen in cross section in FIG. 4.

In FIG. 5, the steering bar 38 is shown, including a telescoping portion 110 having a row of openings for placement in registration to adjust for varying lengths of the steering bar 38. A pin 114 extends through two of the openings 112. The eye member 90, which is bolted to the steering bar 38, can be seen encircling the transverse bar 92. Enough play exists between the eye 90 and the transverse bar 92 to enable the steering bar 38 to be swung arcuately for steering movement of the wheeled frame 34. However, if necessary the transverse bar 92 can also be formed in an arcuate shape to accommodate a greater degree of steering and/or a lesser degree of play between the eye and the transverse bar.

With reference to FIG. 6, a second embodiment of the invention is shown including a pair of feed conveyors 120 and 122 extending transversely to the main conveyor 10 from work stations 124 and 126 at each side of the main conveyor 10. It is, thus, possible to feed material to the main conveyor 10 from a variety of locations within a facility including from a plurality of locations.

Thus, there is shown and described a conveyor system having a longitudinally movable main conveyor suspended at one end from a trolley and supported at a second end by a steerable wheeled frame, the main conveyor being fed by one or more stationary feed conveyors. The longitudinally extending main conveyor can be used to fill an area completely, such as with bulk or loose material, without occupying floor space or requiring expensive docks. Work stations feeding the main conveyor need not be moved each time the conveyor is moved. The present conveyor system is easy to operate and relatively simple to construct while providing an efficient and space saving means of transporting articles.

Although other modifications and changes may be suggested by those skilled in the art, it is the intention of the inventor to embody within the patent warranted hereon all changes and modifications as reasonably and properly come within the scope of his contribution to the art.

I claim:

1. A conveyor system for moving loose articles from a stationary interior location into a truck trailer positioned at a loading dock, comprising:

a main conveyor having a length sufficient to extend from the loading dock to deposit the articles into a far end of the truck trailer located at the loading dock, said main conveyor having a first suspended end and a second opposite end supported from below, said main conveyor including a motor driven endless belt for transporting articles along said main conveyor and into the truck trailer;

means for suspending said first suspended end of said main conveyor including:

a substantially horizontal overhead rail extending generally longitudinally of said main conveyor to substantially above the loading dock;

a wheeled trolley mounted on said overhead rail for rolling movement along said overhead rail;

suspension means for supporting said first suspended end of said main conveyor from said wheeled trolley;

means for supporting said second end of said main conveyor from below including:

an abbreviated platform on the loading dock at substantially the same height as a bed of the truck trailer at the loading dock, a wheeled frame having at least a pair of wheels for selective support on said abbreviated platform, said wheeled frame supporting said second end on said pair of wheels for longitudinal movement, said main conveyor being longitudinally movable by rolling said wheeled frame along the bed of the truck trailer and simultaneously rolling said wheeled trolley along the overhead rail so that said second end of said main conveyor is longitudinally moved along the length of the truck trailer to convey the loose articles into the truck trailer in longitudinally distributed fashion; and means for placing the loose articles on said main conveyor to enable said main conveyor to transport the articles into said truck trailer, said placing means including a substantially stationary second conveyor extending from said stationary interior location to a portion of said main conveyor generally above the loading dock so that the loose articles are carried from said stationary interior location by said stationary second conveyor to said main conveyor which transports the articles into the truck trailer for depositing along the length of the truck trailer as said main conveyor is moved longitudinally.

2. A conveyor system as claimed in claim 1, whrein said wheeled frame includes steerable wheels.

3. A conveyor system for moving articles to a predetermined area, comprising:
a main conveyor having a first suspended end and a second opposite end supported from below, said main conveyor including means for transporting articles along said main conveyor;
means for suspending said first suspended end of said main conveyor, said suspending means being longitudinally movable relative to said main conveyor;
means for supporting said second end of said first conveyor from below, said supporting means being longitudinally movable so that said first conveyor is longitudinally movable on said suspending means and on said supporting means to extend to said predetermined area; and
means for placing the articles on said main conveyor to enable said main conveyor to transport the articles to said predetermined area,
said means for supporting said second end of said main conveyor including a wheeled frame; said wheeled frame including steerable wheels;
means for steering said steerable wheels including:
a pivot between said steerable wheels and said main conveyor;
a steering shaft connected to said steerable wheels and having a generally longitudinal extent;
an eye on said steering shaft; and
a transversely extending rod extending through said eye.

4. A conveyor system for moving articles to a predetermined area, comprising:
a main conveyor having a first suspended end and a second opposite end supported from below, said main conveyor including means for transporting articles along said main conveyor;
means for suspending said first suspended end of said main conveyor, said suspending means being longitudinally movable relative to said main conveyor;
means for supporting said second end of said first conveyor from below, said supporting means being longitudinally movable so that said first conveyor is longitudinally movable on said suspending means and on said supporting means to extend to said predetermined area;
said means for supporting said second end of said main conveyor including a wheeled frame;
a barrier member fastened to said wheeled frame, said barrier member extending substantially transversely to said main conveyor.

5. A conveyor system as claimed in claim 1, wherein said means for suspending said first suspended end of said main conveyor includes a trolley movably mounted on a longitudinally extending rail.

6. A conveyor system as claimed in claim 1, wherein said longitudinally extending rail is an I-beam.

7. A conveyor system as claimed in claim 1, further comprising:
upstanding side members extending longitudinally along each side of said main conveyor to form a trough.

8. A conveyor system as claimed in claim 1, wherein said second conveyor is inclined and lies in plane generally parallel to main first conveyor.

9. A conveyor system as claimed in claim 1, further comprising:
a plurality of said feed conveyor arranged to transport articles to said main conveyor.

10. A conveyor system for loading loose material into an elongated compartment from a stationary feed location, comprising:
a generally horizontal main conveyor having a first end suspended from a wheeled trolley and a second end supported from below on an elevated wheeled frame, said second end of said main conveyor being selectively longitudinally moveable into and substantially along a length of the elongated compartment by said wheeled frame being rolled along a floor of said elongated compartment to deposit the loose material into the elongated compartment along substantially the length thereof as said main conveyor is moved along the main compartment, said main conveyor including a motor driving an endless belt to carry the loose material along said main conveyor;
means for steering said wheeled frame during longitudinal movement of said main conveyor along said elongated compartment;
a longitudinally extending rail member positioned substantially parallel to said main conveyor, said wheeled trolley being mounted for selective movement along said rail member during longitudinal movement of said main conveyor;
at least one feed conveyor operable to transport the loose material from the stationary feed location to above and onto said main conveyor, said feed conveyor being generally stationarily mounted; and
side wall members provided extending along each side of said main conveyor.

11. A conveyor system as claimed in claim 10, further comprising:
a flexible suspension member connected between said wheeled trolley and said first end of said main conveyor, said flexible suspension member accomodating steering of said wheeled frame.

12. A conveyor system as claimed in claim 10, wherein said feed conveyor is inclined and has one end extending above said main conveyor, and further comprising:
a ramp affixed to said inclined feed conveyor so that articles carried by said feed conveyor are transfered to said main conveyor.

13. A conveyor system as claimed in claim 10, wherein said second end of said main conveyor extends horizontally beyond said wheeled frame.

14. A conveyor system, comprising:
a generally horizontal main conveyor suspended at a first end by a wheeled trolley and supported at a second end by a wheeled frame to enable said main conveyor to be moved longitudinally, said main conveyor including a motor driving an endless belt to carry articles along said main conveyor;
means for steering said wheeled frame during longitudinal movement of said main conveyor;

a longitudinally extending rail member on which said wheeld trolley rides during movement of said main conveyor;

at least one feed conveyor for transporting articles to said main conveyor, said feed conveyor being generally stationarily mounted, and side wall members provided longitudinally extending along each side of said main conveyor; and a vertically disposed barrier plate affixed to said wheeled frame and extending transversely of said main conveyor, said barrier plate extending to just above a support surface on which said wheeled frame rests to prevent articles from sliding passed said barrier plate.

15. A conveyor system as claimed in claim 1, wherein said supporting means includes means for adjusting the height of said supporting means.

16. A conveyor system as claimed in claim 10, wherein said supporting means includes means for adjusting the height of said supporting means.

* * * * *